(12) United States Patent
Wang et al.

(10) Patent No.: US 10,826,826 B1
(45) Date of Patent: Nov. 3, 2020

(54) SUPPORTING OVERLAY NETWORKS FOR MULTIPLE AUTONOMOUS SYSTEMS AND UNDERLAYS

(71) Applicant: Cisco Technology, Inc., San Jose, CA (US)

(72) Inventors: Yichen Wang, San Jose, CA (US); Ian Wells, San Jose, CA (US); Vasudevan Mahalingam, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 16 days.

(21) Appl. No.: 16/406,275

(22) Filed: May 8, 2019

(51) Int. Cl.
*H04L 12/713* (2013.01)
*H04L 12/715* (2013.01)
*G06F 9/455* (2018.01)
*H04L 12/931* (2013.01)

(52) U.S. Cl.
CPC ........ *H04L 45/586* (2013.01); *G06F 9/45558* (2013.01); *H04L 45/04* (2013.01); *H04L 45/64* (2013.01); *H04L 49/70* (2013.01); *G06F 2009/45587* (2013.01); *G06F 2009/45595* (2013.01)

(58) Field of Classification Search
CPC ....... H04L 45/586; H04L 45/04; H04L 45/64; H04L 49/70; G06F 9/45558; G06F 2009/45595; G06F 2009/45587
See application file for complete search history.

(56) References Cited

U.S. PATENT DOCUMENTS

| | | | |
|---|---|---|---|
| 9,747,249 B2 | 8/2017 | Cherian et al. | |
| 9,906,401 B1 | 2/2018 | Rao | |
| 9,954,763 B1* | 4/2018 | Ye | H04L 41/0813 |
| 10,153,940 B2 | 12/2018 | Anand et al. | |
| 10,355,989 B1* | 7/2019 | Panchal | H04L 45/586 |
| 2015/0163323 A1* | 6/2015 | Moreno | H04L 12/4679 709/201 |
| 2017/0005923 A1 | 1/2017 | Babakian | |
| 2017/0149582 A1* | 5/2017 | Cohn | H04L 12/66 |
| 2017/0149687 A1 | 5/2017 | Udupi et al. | |
| 2020/0073692 A1* | 3/2020 | Rao | G06F 9/5077 |

* cited by examiner

*Primary Examiner* — Robert C Scheibel
(74) *Attorney, Agent, or Firm* — Polsinelli PC (57) ABSTRACT

A network management method includes a controller receiving an underlay network identifier and a network segment identifier. The underlay network identifier and network segment identifier can be associated with entries in a forwarding information base and border gateway protocol speakers may be deployed in association with the entries. A virtual network can be associated with the underlay network and network traffic can be forwarded to the virtual network according to the entries.

20 Claims, 6 Drawing Sheets

SUPPORTING OVERLAY NETWORKS FOR MULTIPLE AUTONOMOUS SYSTEMS AND UNDERLAYS

FIELD

The present technology generally relates to network management in a cloud environment. In particular, the present technology relates to managing network traffic for multiple autonomous systems in a network.

BACKGROUND

In many situations, multiple overlay networks are run over a shared underlay network. For example, a business may operate a management network and a customer service network as respective overlay networks over a shared network with networking segmentation done primarily in the respective overlay networks. However, in some cloud environments, the overlay networks may be hosted on, partially or completely, different underlay networks. Further, edge routers which normally only support routing within one autonomous system (AS) are often used where network traffic over respective overlay networks must be completely isolated such as for security purposes, compliance purposes, etc. Additionally, it is often the case that various policies are enforced to prevent contamination between multiple underlay networks. In some cases, additional hardware may be added to isolate underlay networks, as well as increase scalability, such as by adding an additional switch. However, the additional hardware increases the cost and maintenance of the overall network.

BRIEF DESCRIPTION OF THE DRAWINGS

In order to describe the manner in which the various advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompany drawings in which.

DESCRIPTION OF EXAMPLE EMBODIMENTS

Various embodiments of the disclosure are discussed in detail below. While specific representations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain cases, well-known or conventional details are not described in order to avoid obscuring the description. References to one or more embodiments in the present disclosure can be references to the same embodiment or any embodiment; and, such references mean at least one of the embodiments.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatuses, methods, and their related results according to the embodiments of the present disclosure are given below. Note that titles or subtitles may be used in the examples for convenience of a read, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure can be realized and obtained by means of the instruments and combinations particularly pointed out in the appended claims. These and other features of the disclosure will be become fully apparent from the following description and appended claims, or can be learned by the practice of the principles set forth herein.

Overview

Network devices with an underlay network, such as edge routers and the like, generally have a limited supply of sub-interfaces, bridge domains (BDs), etc., which may be used to manage multiple logical networks (e.g., autonomous systems (AS), etc.). For example, individual BDs may each be associated with a respective tenant network, management network, infrastructure network, etc. As a result, the number of AS run through a network device, such as a router, may exceed the number of BDs supported by said network device. Adding additional network devices to the underlay network, such as switches and the like, increases the cost of the underlay network to deploy and maintain. For example, additional hardware can increase power consumption, require additional technician time for updates, etc.

In addition, many network devices, such as routers, may explicitly support a single AS per hardware device. As a result, multiple overlay networks designed to be operated over isolated underlay networks may need to be managed (e.g., merged onto) over a shared underlay network. For example, virtual network ranges may need to be reprovisioned (e.g., to avoid conflicts from the merge, etc.), access control lists (ACLs) may need to be re-enforced, and various other complex operations may be executed to successfully perform a merge.

In some examples, multiple AS may be supported by a cloud network in order to support multiple fully isolated overlay networks (e.g., deployed over independent underlay networks). As a result, various components of a respective control plane and data plane of the cloud network can be made AS aware. A network controller may receive AS associated tuples, forwarding information base (FIB) entries may be associated with respective AS and isolated between associated AS, multiple border gateway protocol (BGP) speakers may be associated with different ASs and run with respective configurations, and virtual networks can be associated with individual underlay networks and respective ASs. As a result, multiple overlay networks may be deployed over multiple underlay networks while avoiding merging the underlay networks.

EXAMPLE EMBODIMENTS

Communications networks may host a variety of private networks over either or both physical and virtual network devices. In the case of virtual network devices, virtual machines can be used to executed network functions, applications, and database servers that may otherwise be hosted on dedicated physical devices. As a result, virtual devices can be scaled as needed, for example, by deploying additional virtual machines in a service or network cloud. Network function devices (e.g., switches, routers, network access points, packet inspectors, etc.) and network-related compute devices (e.g., firewalls, intrusion detection systems, network management systems, etc.) may be executed as virtual devices and so can be scaled according to need without having to deploy additional dedicated hardware.

Using virtualized devices and services, core components of a network control plane can be made AS aware and manage mapping of overlay networks to underlay networks. In one example, without imputing limitation and for purposes of explanation, a first overlay network domain and a second overlay network domain can be assigned to different edge routers. Each edge router may in turn be associated with respective virtual tunnel endpoints (VTEPs), which may be associated with respective virtual infrastructure managers (VIMs). In particular, virtual routers (e.g., vector packet processing functions (VPPs), etc.) installed by respective VIMs may include multiple VTEPs, each associated with a particular edge router. In turn, the respective VPPs may distribute network traffic received via the VTEPs to downstream virtual networks and the like. As a result, respective traffic through the first overlay network and second overlay network traverses isolated network functions (e.g., underlay networks).

The first overlay domain and second overlay domain can each be associated with respectively defined underlay networks. For example, as seen in Table 1 below, overlay1 may be a designated network segment associated with a defined subnet and pool, and overlay2 may be a defined network segment associated with another defined subnet and pool. In some examples, where control plane and data plane components are AS aware, the subnet and pools can be shared and isolation may be enforced via protocol and policy. For example, 10.1.1.0/24 in overlay1 may be prohibited from accessing 10.1.1.0/24 in overlay2 as they are on different underlays. In some examples, the contents of Table 1 can be generated by providing a tuple to a network controller (e.g., a software defined network (SDN) controller, etc.) including an underlay network name and a segmentation identifier.

TABLE 1

Networking Configurations

{
   gateway: 10.1.1.1
   segments: [overlay1]
   subnet: 10.1.1.0/24
   pool: [10.1.1.100 to 10.1.1.199]
   vlan_id: 2998
   gateway: 10.2.2.1
   segments: [overlay2]
   subnet: 10.2.2.0/24
   pool: [10.2.2.100 to 10.2.2.199]
   vlan_id: 2999
}

Further, in some examples, multiple BGP speakers may be associated with respective AS, underlay network, and overlay network combinations to maintain routing information (e.g., routes, etc.) in accordance with forwarding information base (FIB) databases. The BGP speakers may be virtual devices and so can be scaled as needed (e.g., for high availability (HA) purposes, etc.) and, for example, based on how many overlay networks are being maintained in isolation from each other. The BGP speakers may synchronize routes to a segmented section of a respective FIB database matched to underlay namespace. In some examples, as seen in Table 2 below, addresses for the BGP speakers may be defined and assigned at the network controller.

TABLE 2

Servers Configurations

{
  server1:
    controller_address: {ip: 172.28.121.142}
    rack_info: {rack_id: RackA}
    bgp_speaker_addresses: {overlay1: 10.1.1.10, overlay2: 10.2.2.10}
  server2:
    controller_address: {ip: 172.28.121.143}
    rack_info: {rack_id: RackB}
    bgp_speaker_addresses: {overlay1: 10.1.1.11, overlay2: 10.2.2.11}
  server3:
    controller_address: {ip: 172.28.121.144}
    rack_info: {rack_id: RackC}
    bgp_speaker_addresses: {overlay1: 10.1.1.12, overlay2: 10.2.2.12}
}

In particular, information from declaring the overlay networks, such as in Table 1 above, is reused and matches information included in declaration of the BGP speakers, such as in Table 2. Likewise, network options may define BGP parameters for each overlay network. Unique underlay network names may be used to identify and map distinct underlay networks to distinct overlay networks, as seen in Table 3 below.

TABLE 3

Network Options Configurations

```
{
    overlay:
        overlay1:
            underlay_name: phys_overlay1
            bgp_as_num: 23
            bgp_peers: ['10.1.1.18', '10.1.1.19']
            bgp_router_id: 10.1.1.9
        overlay2:
            underlay_name: phys_overlay2
            bgp_as_num: 25
            bgp_peers: ['10.2.2.18', '10.2.2.19']
            bgp_router_id: 10.2.2.9
}
```

As seen in Table 3 above, overlay1 and overlay2 are mapped to different BGP groups. The BGP groups are defined by "bgp_as_num" as well as respective pool values such as "bgp_peers" and "bgp_router_id" which provide addressing information for the respective BGP speakers. As a result, virtual networks (e.g., virtual routing and forwarding (VRF), etc.) can be assigned routes associated with different AS and so provide isolation between respective routes. Each virtual network can be assigned to a respective underlay network (e.g., phys_overlay1, phys_overlay2, etc.) and a single uplink. Tunnels (e.g., peering connections) made for an overlay network may be associated with the respective associated virtual network. Additionally, in some examples, a single bridge domain or sub-interface may be assigned to a particular underlay network and so avoid modifying network layer partition and/or access control list (ACL) entries.

Figure 1:
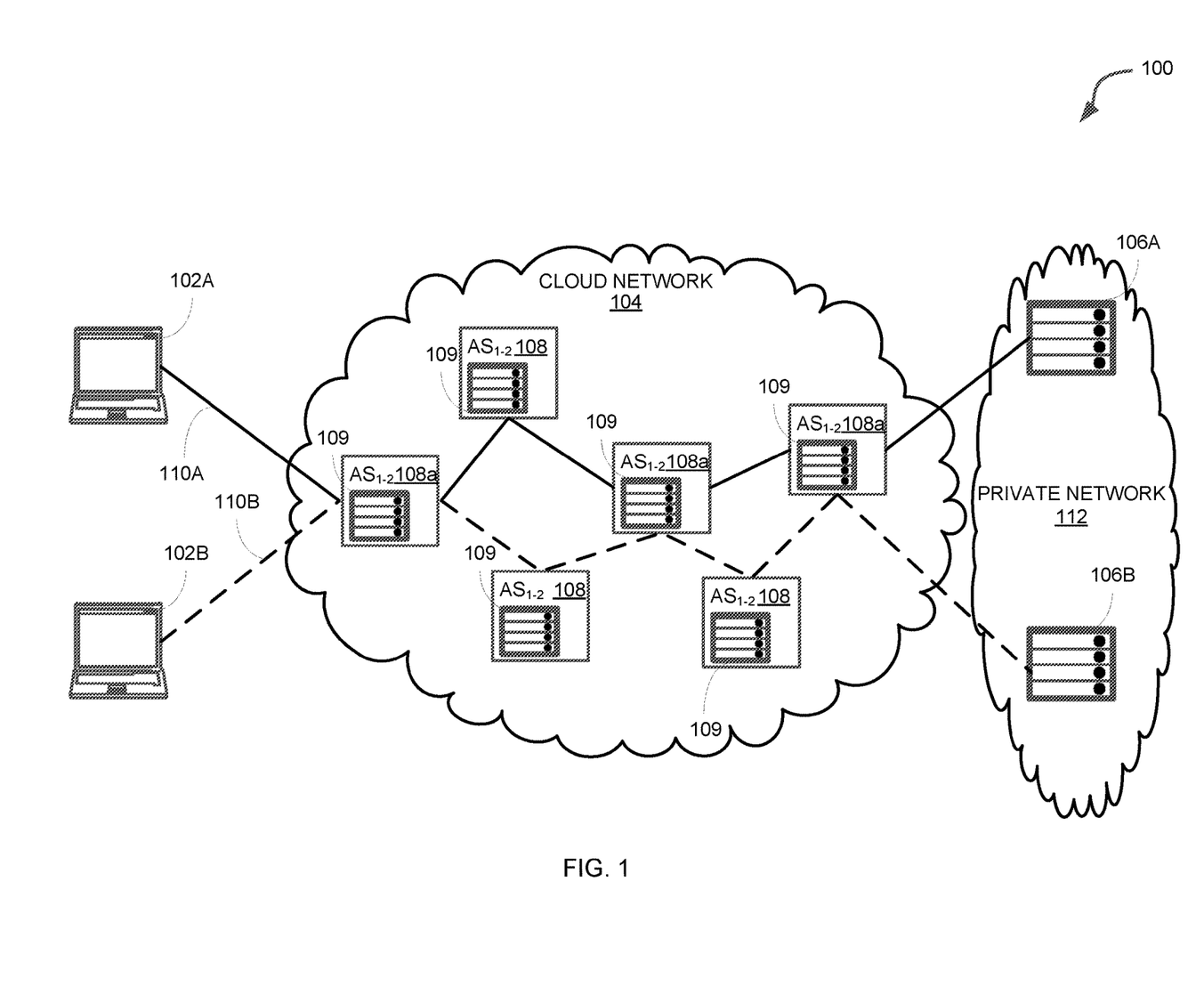
FIG. 1 illustrates an example networking environment, according to various embodiments of the subject technology.

FIG. 1 depicts a networking environment 100. User terminals 102A-B connect to respective application servers 106A-B. User terminals 102A-B may be computers, smartphones, tablet devices, laptops, or various other compute devices. For example, user terminal 102A may execute a management application for accessing a private network (e.g., a company intranet, etc.) and user terminal 102B may execute a publicly facing application (e.g., a customer portal, e-commerce site, etc.) connecting a user to services within a shared private network 112, which may be hosted on local (or cloud provided) servers 106A-B.

In particular, data exchanged between user terminals 102A-B and respective application servers 106A-B traverses a cloud network infrastructure 104 along respective routes 110A-B. Cloud network infrastructure 104 includes various nodes 108 which may be virtualized and/or physical devices such as switches, routers, etc., deployed to servers 109. Nodes 108 are mapped to autonomous systems (AS) 1-2.

As depicted in FIG. 1, routes 110A-B may share particular nodes 108a within cloud network infrastructure 104. For example, nodes 108a may include network switches or the like for forwarding traffic, etc. As a result, nodes 108a may include multiple virtualized devices (e.g., virtual switches) for processing traffic for particular AS so as to keep data forwarded along routes 110A-B isolated from each other.

Figure 2:
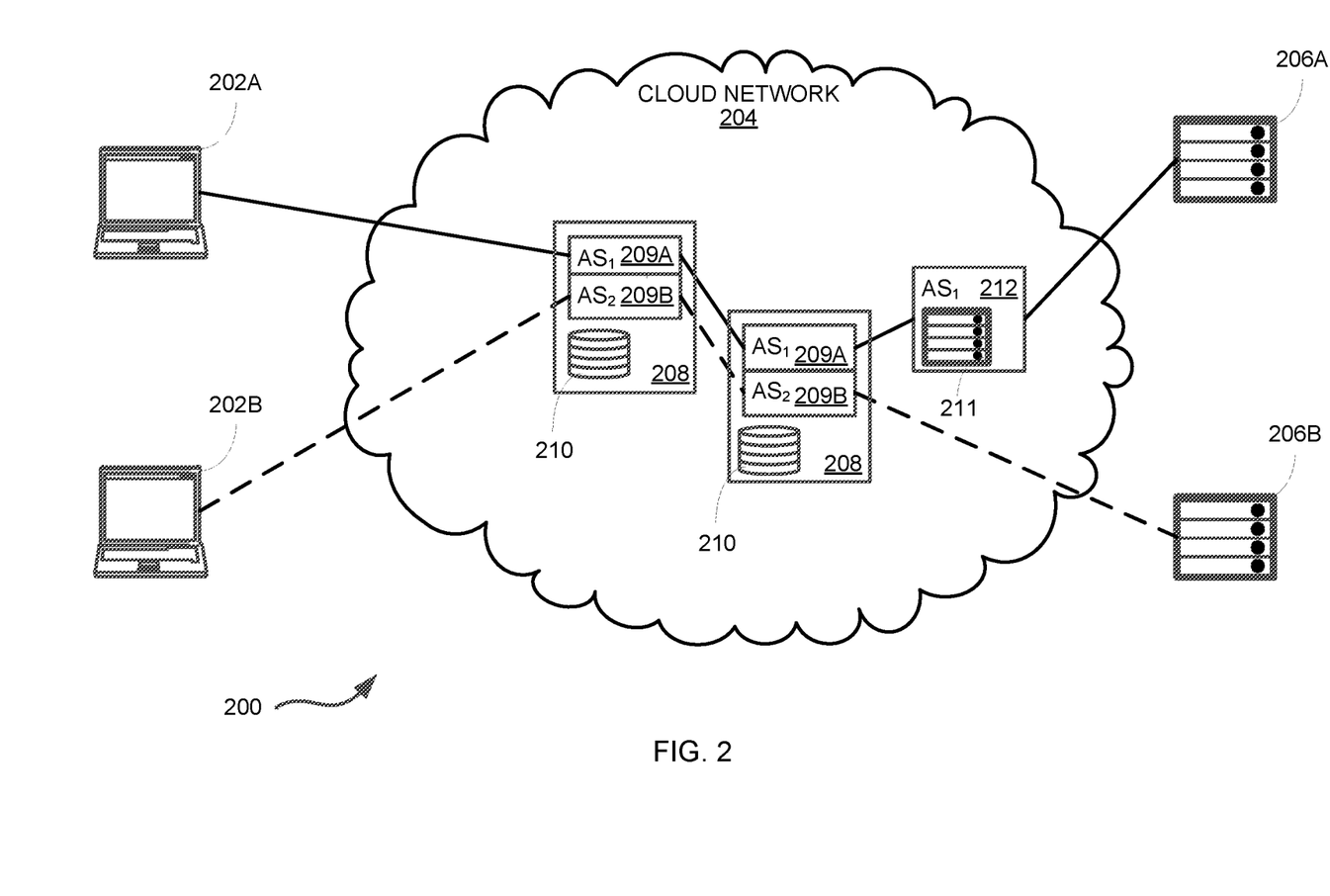
FIG. 2 illustrates an example of a networking environment, according to various embodiments of the subject technology.

FIG. 2 depicts a networking environment 200 in which virtualized services maintain isolation between respective routes associated with particular AS. Here, user terminals 202A-B each communicates with respective application servers 206A-B over a cloud network infrastructure 204. Cloud network infrastructure 204 includes nodes 208 and 212. In particular, nodes 208 are servers running virtualized resources (e.g., virtual routers, switches, etc.) whereas node 212 is a dedicated hardware resource 211.

Nodes 208 include virtual resource 209A associated with AS1 and virtual resource 209B associated with AS2. In particular, virtualized resources 209A and 209B receive and process traffic associated with each respective AS and so maintain isolation between overlay networks associated with each AS. In some examples, nodes 208 may include a sectioned database 210 which may serve as a forwarding information base (FIB) for respective virtual resources. In particular, sectioned database 210 includes forwarding entries associated with particular overlay networks and/or AS via respective namespace fields (e.g., as discussed above). As a result, network traffic can be isolated according to overlay network and/or AS. Further, because resources 209A-B are virtualized resources, cloud network infrastructure 204 may scale additional or expanded resources as needed to accommodate more traffic, additional overlay networks, etc. while avoiding installing additional dedicated hardware resources 211.

Figure 3:
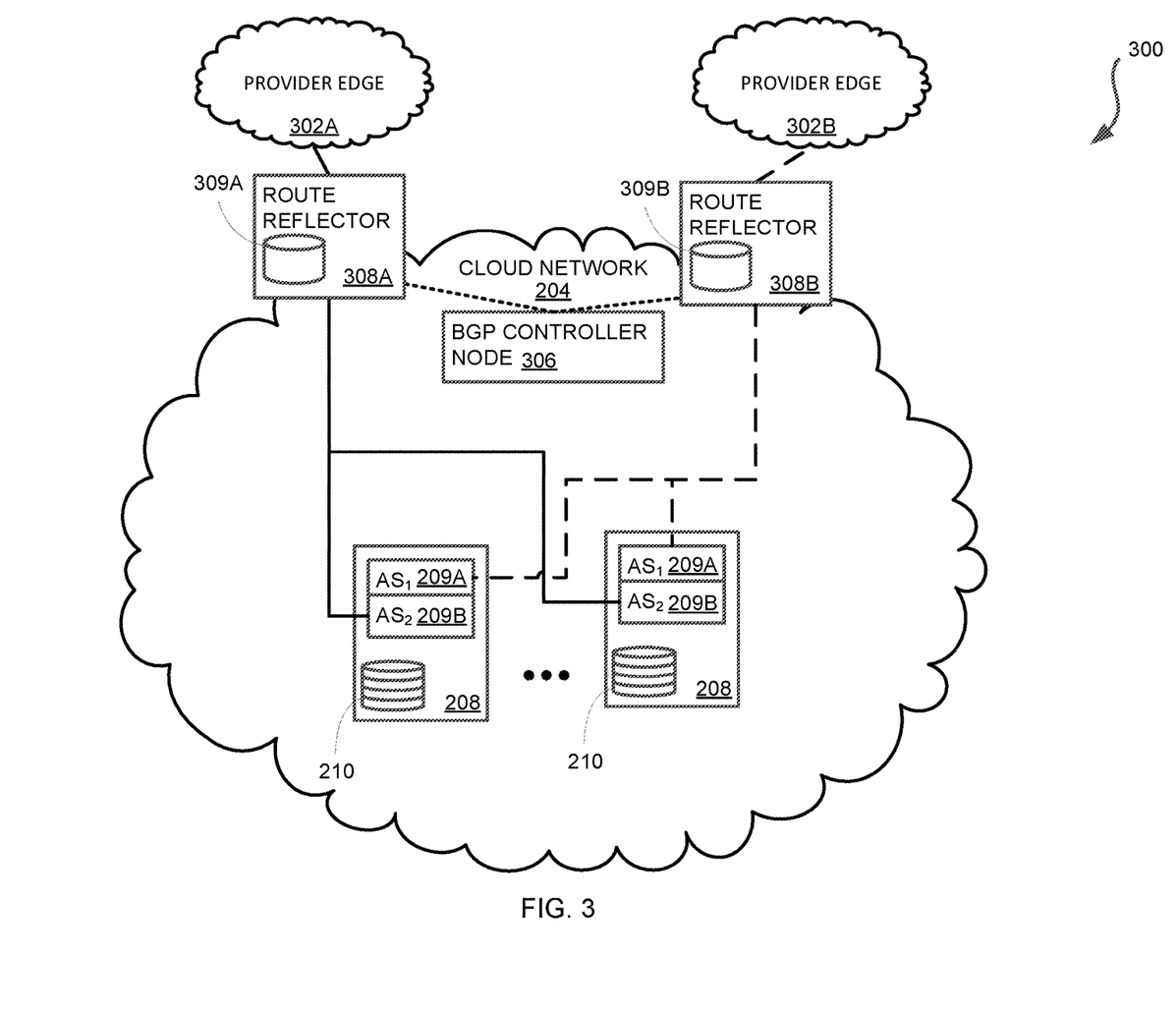
FIG. 3 illustrates an example control plane, according to various embodiments of the subject technology.

FIG. 3 depicts a control plane 300 for a networking environment such as networking environment 200. Control plane 300 may maintain forwarding and routing information within cloud network infrastructure 204 to maintain isolation between overlay networks (e.g., associated with distinct AS). To maintain forwarding and routing information, BGP speakers may be provided as virtual devices hosted on one or more servers within cloud network infrastructure 204.

Here, route reflectors 308A-B receive BGP information from provider edge networks 302A-B. In particular, route reflectors 308A-B include a data store 309A-B for storing received BGP information. While depicted in FIG. 3 as within respective route reflectors 308A-B, data stores 309A-B may be external storage processes or services accessible over a control plane network that may be a virtual network (e.g., virtual local area network (VLAN), etc.), physical network, or some combination of the two. A BGP controller node 306 may include a virtual device management service or protocol and can deploy and maintain route reflectors 308A-B (and/or additional router reflectors not depicted).

Here, route reflector 308A is associated with AS2 and route reflector 308B is associated with AS1. In particular, route reflector 308A distributes BGP updates to virtual routers 209B (associated with AS2) throughout cloud network infrastructure 204. Likewise, route reflector 308B distributes BGP updates to virtual routers 209A (associated with AS1) throughout cloud network infrastructure 204. In some examples, respective FIB entries may be written, deleted, or updated within sectioned databases 210 according to the received BGP updates from route reflectors 308A-B.

Figure 4:
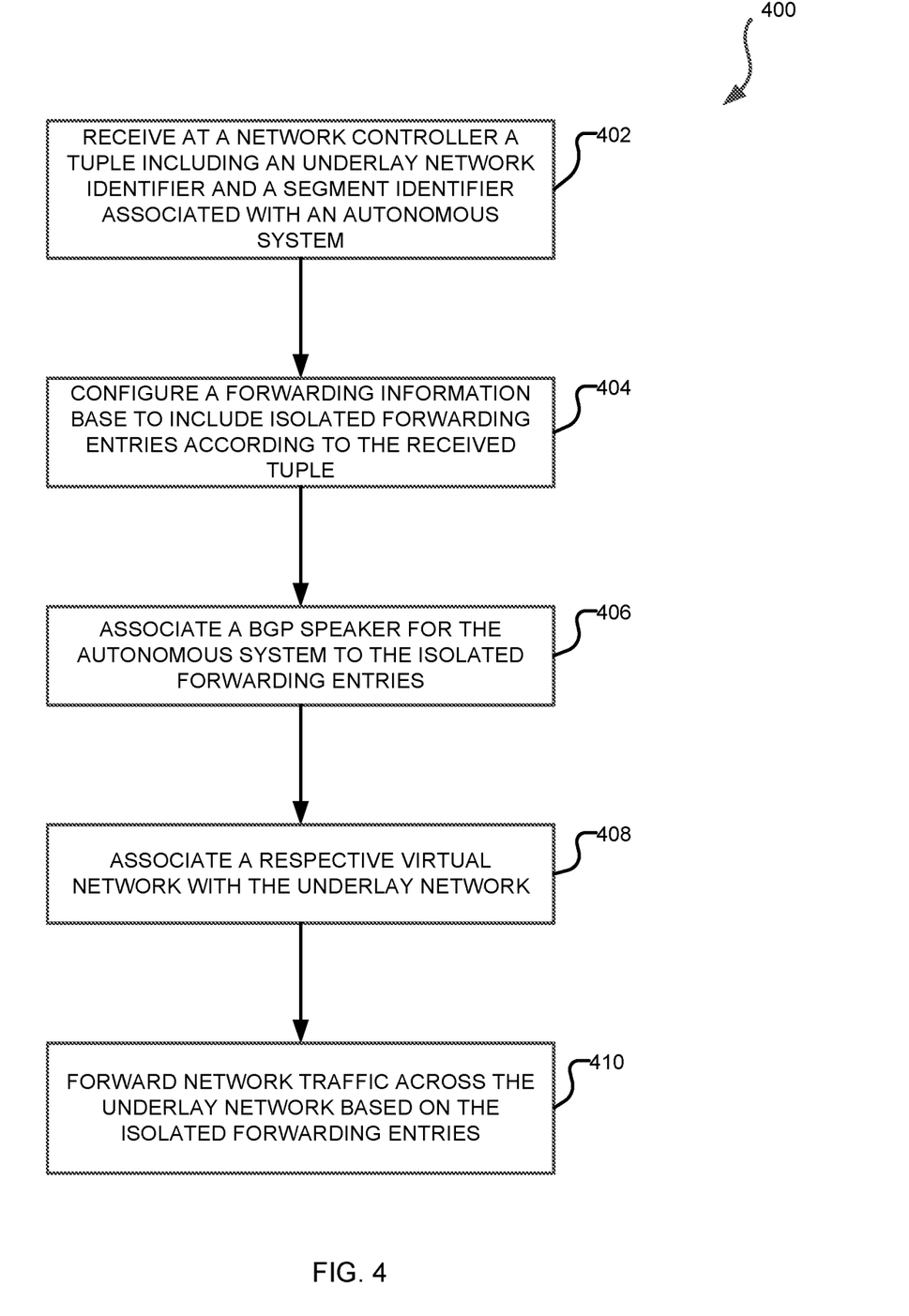
FIG. 4 illustrates a flowchart of an example method for managing multiple overlay networks, according to various embodiments of the subject technology.

FIG. 4 depicts a method 400 for managing network traffic associated with a particular overlay network (e.g., assigned to a particular autonomous system (AS)) over an isolated underlay network. Method 400 may, for example, be performed over networking environment 204 and utilize various virtual devices therein such as nodes 208, route reflectors 308A-B, BG controller node 306, sectioned databases 210, etc.

At step 402, a network controller (e.g., SDN controller, etc.) receives a tuple including an underlay network identifier and a network segment identifier. In some examples, a network administrator may provide the tuple to the network controller (e.g., via an administration interface, etc.). In some examples, the tuple may be received as part of a larger data structure (e.g., a JSON object, etc.) including additional information for network deployment and/or management.

At step 404, a forwarding information base (FIB) is configured to include isolated forwarding entries based on the information of the received tuple. For example, the FIB may be stored in sectioned database 210 and each section may include forwarding entries associated with a particular underlay network identifier of a tuple or with the respective associated AS.

At step 406, a border gateway protocol (BGP) speaker for the AS (associated with the underlay of the tuple) is associated to the isolated entries of the FIB. The BGP speaker may be a software, or virtualized, BGP speaker. In particular, the BGP speaker provides BGP updates to respective associated entries in the FIB.

At step 408, a respective virtual network is associated with the underlay network. For example, application servers and processes running within a local network as a private virtual network may be associated with the underlay and so receive traffic that has been fully isolated from traffic for other private networks within the local network.

At step 410, network traffic is forwarded across the underlay network based on the isolated forwarding entries. As a result, network traffic need not be merged or otherwise mixed together as it is forwarded across nodes (e.g., hops) within, for example, cloud network infrastructure 204 and the like.

Figure 5:
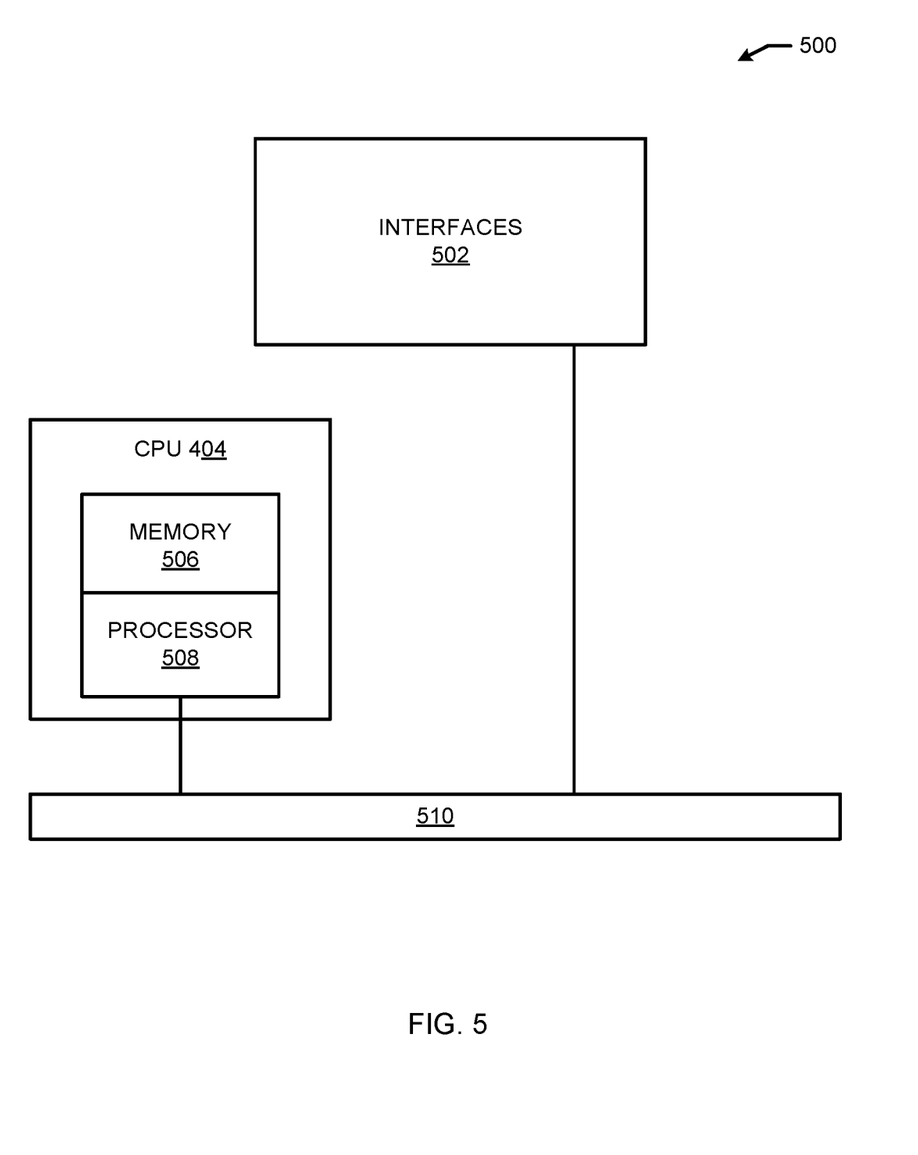
FIG. 5 illustrates an example network device, according to various embodiments of the subject technology.

FIG. 5 illustrates an example network device capable of performing various operations described herein, such as routing, switching, tunneling, etc. Although the system shown in FIG. 5 is one specific network device of the present disclosure, it is by no means the only network device architecture on which the concepts herein can be implemented. For example, an architecture having a single processor 508 that handles communications as well as routing computations, etc., can be used. Further, other types of interfaces and media could also be used with the network device 500.

Regardless of the network device's configuration, it may employ a CPU 504 and one or more memories or memory modules (including memory 506) configured to store program instructions for the general-purpose network operations and mechanisms for functions described herein to be executed by processor 508. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing, switching, and/or other operations. The ASIC can communicate with other components in the network device 500 via the connection 510, to exchange data and signals and coordinate various types of operations by the network device 500, such as routing, switching, and/or data storage operations, for example.

Figure 6:
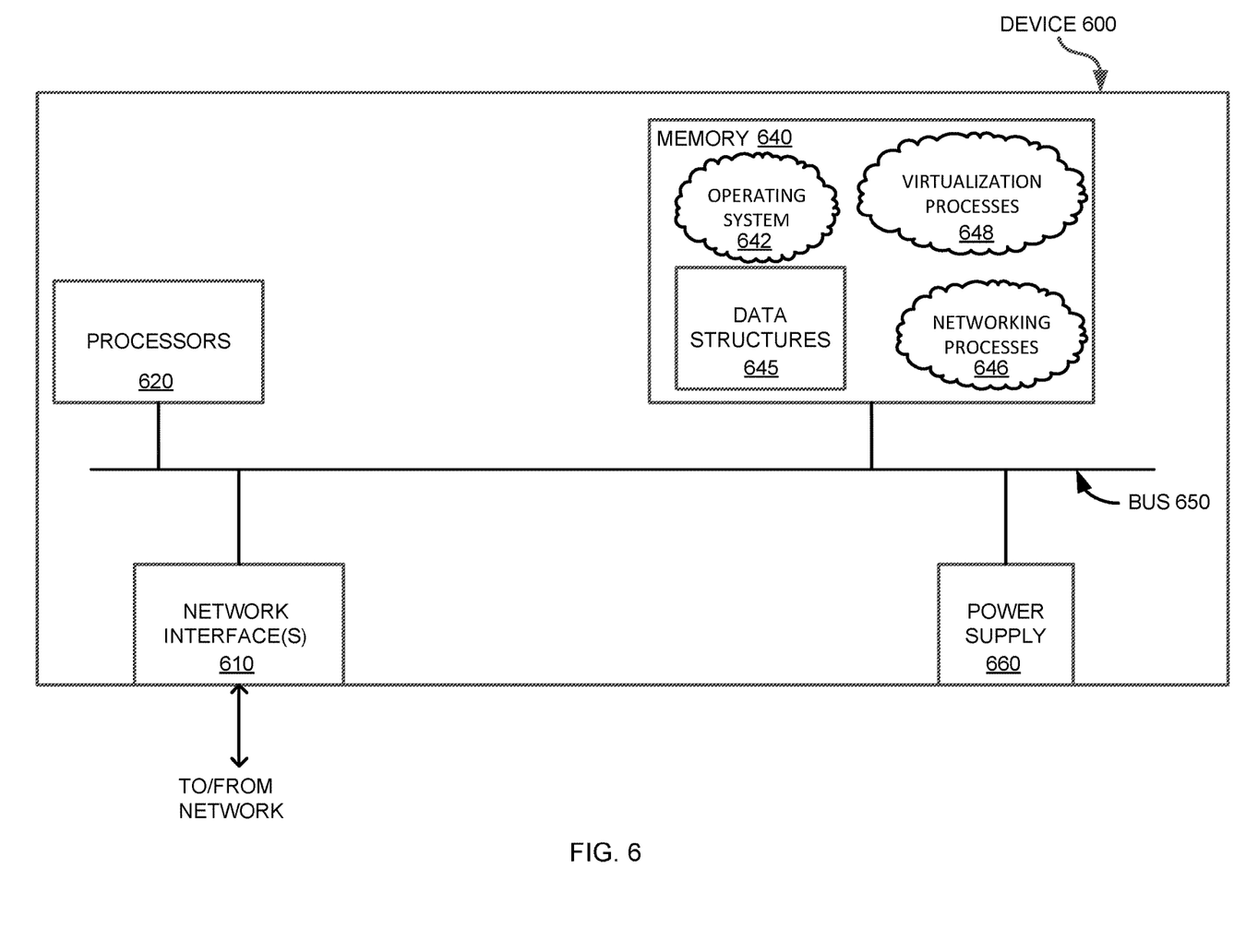
FIG. 6 illustrates an example computing device, according to various embodiments of the subject technology.

FIG. 6 is a schematic block diagram of an example computing device 600 that may be used with one or more embodiments described herein e.g., as any of the discussed above or to perform any of the methods discussed above, and particularly as specific devices as described further below. The device may comprise one or more network interfaces 610 (e.g., wired, wireless, etc.), at least one processor 620, and a memory 640 interconnected by a system bus 650, as well as a power supply 660 (e.g., battery, plug-in, etc.).

Network interface(s) 610 contain the mechanical, electrical, and signaling circuitry for communicating data over links coupled to a network, e.g., providing a data connection between device 600 and the data network, such as the Internet. The network interfaces may be configured to transmit and/or receive data using a variety of different communication protocols. For example, interfaces 610 may include wired transceivers, wireless transceivers, cellular transceivers, or the like, each to allow device 600 to communicate information to and from a remote computing device or server over an appropriate network. The same network interfaces 610 also allow communities of multiple devices 600 to interconnect among themselves, either peer-to-peer, or up and down a hierarchy. Note, further, that the nodes may have two different types of network connections 610, e.g., wireless and wired/physical connections, and that the view herein is merely for illustration. Also, while the network interface 610 is shown separately from power supply 660, for devices using powerline communication (PLC) or Power over Ethernet (PoE), the network interface 610 may communicate through the power supply 660, or may be an integral component of the power supply.

Memory 640 comprises a plurality of storage locations that are addressable by the processor 620 and the network interfaces 610 for storing software programs and data structures associated with the embodiments described herein. The processor 620 may comprise hardware elements or hardware logic adapted to execute the software programs and manipulate the data structures 645. An operating system 642, portions of which are typically resident in memory 640 and executed by the processor, functionally organizes the device by, among other things, invoking operations in support of software processes and/or services executing on the device. These software processes and/or services may comprise one or more networking processes 646 which, on certain devices, may be used by an illustrative virtualization process 648, as described herein. Notably, networking processes 646 may be stored and/or retrieved for storage by processor(s) 620 via, for example, network interface(s) 610 or other processes according to the configuration of device 600.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Statements follow describing various aspects of the subject technology:

Statement 1: A method for managing a network includes receiving, at a network controller for the network, an underlay network identifier and a network segment identifier, the network segment identifier associated with an autonomous system and the underlay network identifier associated with at least a portion of an underlay network, associating a subset of entries in a forwarding information base with the network segment identifier and the underlay network identifier, deploying a border gateway protocol speaker to the network, the border gateway protocol speaker associated with the entries in the forwarding information base and the autonomous system, associating a virtual network with the autonomous system and the underlay network, and forwarding network traffic through the network to the virtual network based on the subset of entries in the forwarding information base.

Statement 2: A method according to preceding Statement 1 further includes receiving, at the network controller, a second underlay network identifier and a second network segment identifier, the second network segment identifier associated with a second autonomous system and the second underlay network identifier associated with at least a second portion of an underlay network, associating a second subset of entries in the forwarding information base with the second network segment identifier and the second underlay network identifier, deploying a second border gateway protocol speaker to the network, the second border gateway protocol speaker associated with the isolated entries and the second autonomous system, and associating a second virtual network with the second autonomous system and the second underlay network, and forwarding additional network traffic through the network to the second virtual network based on the second subset of entries in the forwarding information base.

Statement 3: A method according to preceding Statement 2 includes the at least first portion of an underlay network and the at least second portion of an underlay network respectively including overlapping portions of a shared underlay network.

Statement 4: A method according to preceding Statement 2 includes the at least first portion of an underlay network and the at least second portion of an underlay network being fully separate underlay networks.

Statement 5: A method according to any of the preceding Statements includes the network controller receiving a tuple including the underlay network identifier and the network segment identifier.

Statement 6: A method according to any of the preceding Statements includes the border gateway protocol speakers being virtual devices.

Statement 7: A method according to any of the preceding Statements includes the network being a software defined network and the network controller being a software defined network controller.

Statement 8: A method according to any of the preceding Statements includes the one or more underlay network resources including one or more virtual devices.

Statement 9: A method according to preceding Statement 8 includes the one or more virtual devices including one of a virtual router, a virtual switch, or a virtual database.

Statement 10: A system for managing a network includes one or more processors, and a memory comprising instructions for the one or more processors to receive, at a network controller for the network, an underlay network identifier and a network segment identifier, the network segment identifier associated with an autonomous system and the underlay network identifier associated with at least a portion of an underlay network, associate a subset of entries in a forwarding information base with the network segment identifier and the underlay network identifier, deploy a border gateway protocol speaker to the network, the border gateway protocol speaker associated with the entries in the forwarding information base and the autonomous system, associate a virtual network with the autonomous system and the underlay network, and forward network traffic through the network to the virtual network based on the subset of entries in the forwarding information base.

Statement 11: A non-transitory computer readable medium storing instructions which, when executed by one or more processors, causes the one or more processors to receive, at a network controller for the network, an underlay network identifier and a network segment identifier, the network segment identifier associated with an autonomous system and the underlay network identifier associated with at least a portion of an underlay network, associate a subset of entries in a forwarding information base with the network segment identifier and the underlay network identifier, deploy a border gateway protocol speaker to the network, the border gateway protocol speaker associated with the entries in the forwarding information base and the autonomous system, associate a virtual network with the autonomous system and the underlay network, receive, at the network controller, a second underlay network identifier and a second network segment identifier, the second network segment identifier associated with a second autonomous system and the second underlay network identifier associated with at least a second portion of an underlay network, associate a second subset of entries in the forwarding information base with the second network segment identifier and the second underlay network identifier, deploy a second border gateway protocol speaker to the network, the second border gateway protocol speaker associated with the isolated entries and the second autonomous system, associate a second virtual network with the second autonomous system and the second underlay network, forward a first portion of network traffic through the network to the virtual network based on the subset of entries in the forwarding information base, and forward a second portion of network traffic through the network to the second virtual network based on the second subset of entries in the forwarding information base.

What is claimed is:

1. A method for managing a network, the method comprising:

receiving, at a network controller for the network, an underlay network identifier and a network segment identifier, the network segment identifier associated with an autonomous system and the underlay network identifier associated with at least a portion of an underlay network;

associating a subset of entries in a forwarding information base with the network segment identifier and the underlay network identifier;

deploying a border gateway protocol speaker to the network, the border gateway protocol speaker associated with the entries in the forwarding information base and the autonomous system;

associating a virtual network with the autonomous system and the underlay network; and forwarding network traffic through the network to the virtual network based on the subset of entries in the forwarding information base.

2. The method of claim 1, wherein the underlay network identifier is a first underlay network identifier, the network segment identifier is a first network segment identifier, the autonomous system is a first autonomous system, the portion of the underlay network is a first portion of the underlay network, the subset of entries is a first subset of entries, the border gateway protocol speaker is a first border gateway protocol speaker, and the virtual network is a first virtual network, the method further comprising:

receiving, at the network controller, a second underlay network identifier and a second network segment identifier, the second network segment identifier associated with a second autonomous system and the second underlay network identifier associated with at least a second portion of an underlay network;

associating a second subset of entries in the forwarding information base with the second network segment identifier and the second underlay network identifier;

deploying a second border gateway protocol speaker to the network, the second border gateway protocol speaker associated with the second subset of entries and the second autonomous system;

associating a second virtual network with the second autonomous system and the second underlay network; and forwarding additional network traffic through the network to the second virtual network based on the second subset of entries in the forwarding information base.

3. The method of claim 2, wherein the first portion of an underlay network and the second portion of an underlay network respectively include overlapping portions of a shared underlay network.

4. The method of claim 2, wherein the first portion of an underlay network and the second portion of an underlay network are fully separate underlay networks.

5. The method of claim 2, wherein one or more of the first border gateway protocol speaker or the second border gateway protocol speaker are virtual devices.

6. The method of claim 1, wherein the network controller receives a tuple comprising the underlay network identifier and the network segment identifier.

7. The method of claim 1, wherein the network is a software defined network and the network controller is a software defined network controller.

8. The method of claim 1, wherein the underlay network comprises one or more virtual devices.

9. The method of claim 8, wherein the one or more virtual devices includes one of a virtual router, a virtual switch, or a virtual database.

10. A system for managing a network, the system comprising:
one or more processors; and
a memory comprising instructions for the one or more processors to:
receive, at a network controller for the network, an underlay network identifier and a network segment identifier, the network segment identifier associated with an autonomous system and the underlay network identifier associated with at least a portion of an underlay network;
associate a subset of entries in a forwarding information base with the network segment identifier and the underlay network identifier;
deploy a border gateway protocol speaker to the network, the border gateway protocol speaker associated with the entries in the forwarding information base and the autonomous system;
associate a virtual network with the autonomous system and the underlay network; and
forward network traffic through the network to the virtual network based on the subset of entries in the forwarding information base.

11. The system of claim 10, wherein the underlay network identifier is a first underlay network identifier, the network segment identifier is a first network segment identifier, the autonomous system is a first autonomous system, the portion of the underlay network is a first portion of the underlay network, the subset of entries is a first subset of entries, the border gateway protocol speaker is a first border gateway protocol speaker, and the virtual network is a first virtual network, and the memory further comprises instructions to:
receive, at the network controller, a second underlay network identifier and a second network segment identifier, the second network segment identifier associated with a second autonomous system and the second underlay network identifier associated with at least a second portion of an underlay network;
associate a second subset of entries in the forwarding information base with the second network segment identifier and the second underlay network identifier;
deploy a second border gateway protocol speaker to the network, the second border gateway protocol speaker associated with the second subset of entries and the second autonomous system;
associate a second virtual network with the second autonomous system and the second underlay network; and
forward additional network traffic through the network to the second virtual network based on the second subset of entries in the forwarding information base.

12. The system of claim 11, wherein the first portion of an underlay network and the second portion of an underlay network respectively include overlapping portions of a shared underlay network.

13. The system of claim 11, wherein the first portion of an underlay network and the second portion of an underlay network are fully separate underlay networks.

14. The system of claim 11, wherein one or more of the first border gateway protocol speaker or the second border gateway protocol speaker are virtual devices.

15. The system of claim 10, wherein the network controller receives a tuple comprising the underlay network identifier and the network segment identifier.

16. The system of claim 10, wherein the network is a software defined network and the network controller is a software defined network controller.

17. The system of claim 10, wherein the underlay network comprises one or more virtual devices.

18. The system of claim 17, wherein the one or more virtual devices includes one of a virtual router, a virtual switch, or a virtual database.

19. A non-transitory computer readable medium storing instructions which, when executed by one or more processors, cause the one or more processors to:

receive, at a network controller for the network, a first underlay network identifier and a first network segment identifier, the first network segment identifier associated with a first autonomous system and the first underlay network identifier associated with at least a first portion of an underlay network;

associate a first subset of entries in a forwarding information base with the first network segment identifier and the first underlay network identifier;

deploy a first border gateway protocol speaker to the network, the first border gateway protocol speaker associated with the first subset of entries in the forwarding information base and the first autonomous system;

associate a first virtual network with the first autonomous system and the first underlay network;

receive, at the network controller, a second underlay network identifier and a second network segment identifier, the second network segment identifier associated with a second autonomous system and the second underlay network identifier associated with at least a second portion of an underlay network;

associate a second subset of entries in the forwarding information base with the second network segment identifier and the second underlay network identifier;

deploy a second border gateway protocol speaker to the network, the second border gateway protocol speaker associated with a second subset of entries and the second autonomous system;

associate a second virtual network with the second autonomous system and the second underlay network;

forward a first portion of network traffic through the network to the first virtual network based on the first subset of entries in the forwarding information base; and forward a second portion of network traffic through the network to the second virtual network based on the second subset of entries in the forwarding information base.

20. The non-transitory computer readable medium of claim 19, wherein the network is a software defined network, the network controller is a software defined network controller, and one or more of the first border gateway protocol speaker or the second border gateway protocol speaker are virtual devices.

* * * * *